United States Patent [19]
Goettsch et al.

[11] Patent Number: 5,599,604
[45] Date of Patent: Feb. 4, 1997

[54] REINFORCEMENT FABRIC PLY AND COMPOSITE

[75] Inventors: Larry D. Goettsch, Lincoln; Steve C. Otradovec, Bennet, both of Nebr.

[73] Assignee: The Goodyear Tire & Rubber Company, Akron, Ohio

[21] Appl. No.: 405,658

[22] Filed: Mar. 17, 1995

[51] Int. Cl.⁶ .................................................... B32B 5/12
[52] U.S. Cl. ........................... 428/105; 428/114; 428/254; 428/902; 442/304
[58] Field of Search ................................. 428/102, 105, 428/113, 224, 225, 257, 902, 295, 253, 254, 114

[56] References Cited

U.S. PATENT DOCUMENTS 4,786,541  11/1988  Nishimura et al. ................. 428/902
4,857,379  8/1989  Plontges et al. ..................... 428/102

*Primary Examiner*—James J. Bell
*Attorney, Agent, or Firm*—David E. Wheeler

[57] ABSTRACT

A reinforcing fabric comprises reinforcing warp cords and weft cords that melt at a temperature of 200° to 300° F. The weft cords hold the warp cords in position relative to one another when the fabric is being calendered and placed in an elastomeric composite, but melt at the normal curing temperature of an elastomer to form domains of polymer in the cured composite. The reinforcing fabric has particular use as reinforcement in V-belts.

3 Claims, 3 Drawing Sheets

5,599,604

REINFORCEMENT FABRIC PLY AND COMPOSITE

BACKGROUND OF THE INVENTION

The invention relates to reinforcing fabric, its use in drive belts such as poly-V belts.

Fabric reinforcement is known to provide a stiffening effect in rubber products, especially when laminated fabric plies are used. When laminated fabric plies are used, the reinforcement cords in each ply are usually "laid-up" at different angles in the rubber product, which enhances this stiffening effect since the cords in each ply have different angles of primary stiffness and work against each other.

In some rubber products the reinforcement is provided to prevent stretching or growth of the product or to provide strength in drive applications. In a drive belt, for example, reinforcement in the drive direction of a belt may be provided by cords which provide the drive strength for the belt, and reinforcement perpendicular to the drive direction helps maintain the integrity of the belt in use, i.e. "perpendicular" reinforcement helps prevent separation of the drive cords.

In a drive belt, however, stiffness is not a desirable property since the belt must be easily bended around pulleys and/or sheaves which sometimes have relatively small diameters. Stiffness in such a use equates to resistance, and reduces the efficiency of any drive system using such a belt.

Accordingly, it is an object of the invention to provide a reinforcement fabric that can be incorporated into an elastomeric product that provides strength in substantially one direction, and elastomeric products made using such a reinforcement fabric. Other objects of the invention will be apparent from the following description and claims.

SUMMARY OF THE INVENTION

The present invention relates to a fabric comprising a first plurality of substantially parallel warp direction cords or filaments selected from the group comprising cotton, rayon, polyester, nylon, polyvinylalcohol, fiberglass, steel, aramid, carbon and mixtures thereof, and a second plurality of weft direction cords or filaments having a melting temperature of 200° F. to 300° F. In a first embodiment the first and second plurality of cords or filaments in the fabric are interwoven, and in a second embodiment the first and second plurality of cords or filaments are in contact with one another but are not interwoven. In the second embodiment, the warp direction cords or filaments and the weft direction cords or filaments are held in position relative to one another by filaments having negligible strength.

The weft direction cords or filaments may comprise polypropylene, polyethylene or mixtures thereof.

Also provided is a composite comprising an uncured elastomeric matrix and a fabric reinforcement, the fabric reinforcement comprising a first plurality of substantially parallel warp direction cords or filaments selected from the group comprising cotton, rayon, polyester, nylon, polyvinylalcohol, fiberglass, steel, aramid, carbon and mixtures thereof, and a second plurality of weft direction cords or filaments having a melting temperature of 200° F. to 300° F., essentially as described above.

In one embodiment of the fabric and of the composite, the fabric may comprise interweaving cords or filaments which loop over, under and around the first and second plurality of cords or filaments.

Also provided is a method of making a woven fabric comprising the steps of (a) disposing a first plurality of cords or filaments selected from the group comprising cotton, rayon, polyester, nylon, polyvinylalcohol, fiberglass, steel, aramid, carbon and mixtures thereof substantially parallel to one another, (b) disposing a second plurality of cords or filaments having a melting temperature of 200° F. to 300° F. substantially parallel to one another and substantially perpendicular to said first plurality of cords such that said second plurality of cords comprises ⅓ to ⅛ the number of cords in said first plurality of cords and contacts said first plurality of cords but are not interwoven therewith, and (c) looping an interweaving cord or filament over, under and around said first plurality and second plurality of cords or filaments.

Also provided are a green continuous belt comprising an elastomeric matrix reinforced by a plurality of parallel reinforcement cords or filaments whereby said reinforcement cords or filaments are not connected to each other and move independently of one another in the elastomeric matrix, and a cured continuous belt wherein the weft cords comprised a polymeric material having a melting temperature of 200° F. to 300° F. and the weft cords or filaments were melted and dispersed in the elastomeric matrix during the curing of the belt, creating polymer domains in the elastomeric matrix. In the illustrated embodiment the continuous belt is made using reinforcement fabric having non-interwoven reinforcement cords and weft cords which are held in position relative to one another by interweaving cords or filaments. Also the reinforcement cords are oriented perpendicular to the direction of movement of the belt and the belt has a per unit area flexibility substantially equal to the per unit area flexibility of a single reinforcement cord imbedded in the elastomeric matrix having a thickness substantially equal to the rivet of the belt.

DETAILED DESCRIPTION OF THE INVENTION

Figure 1:
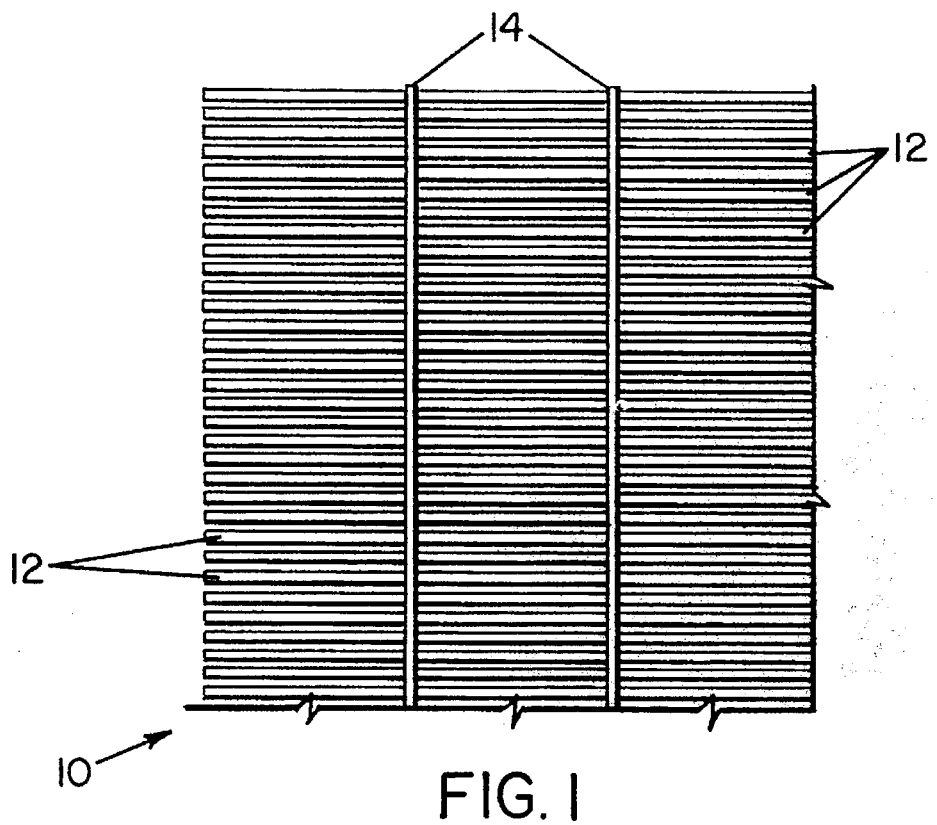
FIG. 1 illustrates a top view of a portion of the fabric of the invention.
Figure 3:
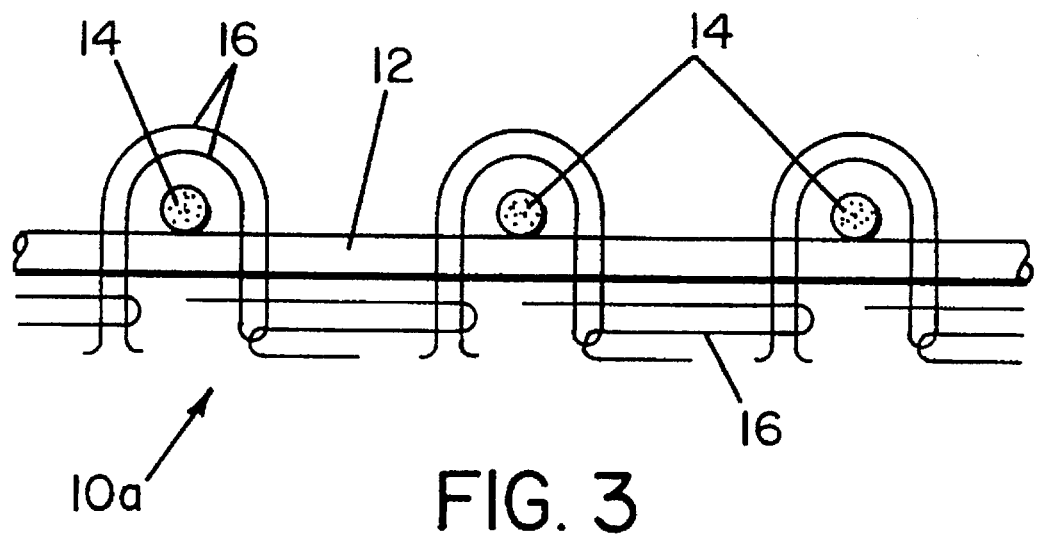
FIG. 3 illustrates a further enlarged side view taken on line 3—3 of the knit structure shown in FIG. 2.
Figure 4:
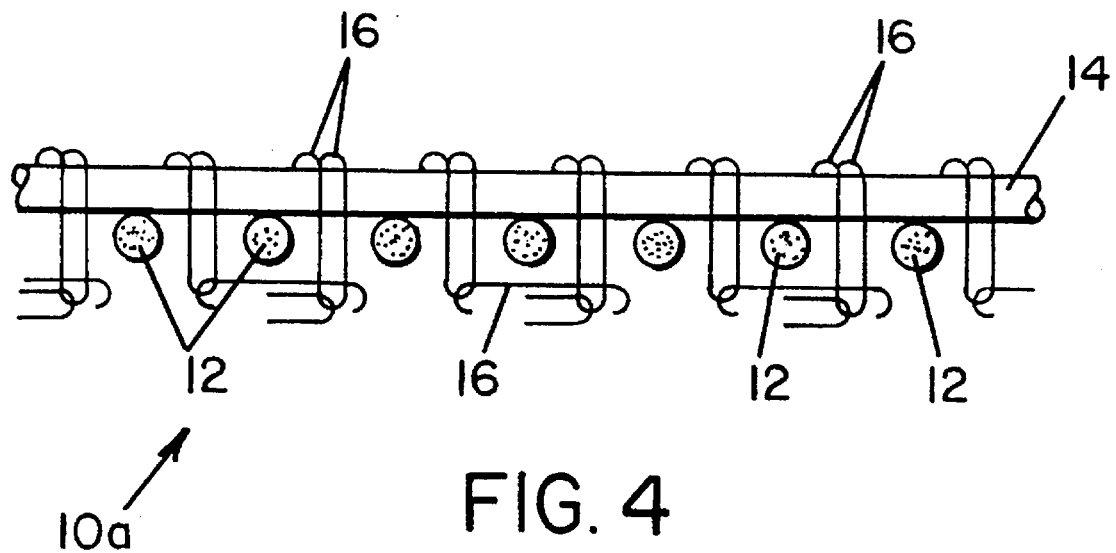
FIG. 4 illustrates an end view taken on line 4—4 of the knit structure shown in FIG. 2.

With reference now to FIG. 1, fabric reinforcement 10 of the invention comprises reinforcing warp yarns or cords 12, and non-reinforcing weft yarns or cords 14 perpendicular thereto. As is known in the art, the end count of the warp cords (ends per inch or (epi) is much higher than the end count of the weft cords, because the weft cords are typically used mainly to hold the warp cords in position relative to one another. Typically warp cords have an end count of about 10 to 18 epi, and weft cords have an end count of 0.5 to 4 epi. The warp and weft cords may be woven together to maintain their relative position, or as illustrated in structure 10a of FIGS. 2–4, the warp and weft cords can be knitted to each other and held in place by knit filaments 16.

In the fabric of the invention, warp cords 12 comprise a tough, strong, high melting material such as cotton, rayon, polyester, nylon, polyvinylalcohol, fiberglass, steel, aramid, carbon and mixtures thereof. The weft cords 14 comprise a polymeric material that melts in the range of 200° to 300° F. such as polypropylene, polyethylene and mixtures thereof. The melting temperature of the weft cords is typically in the curing temperature range of an elastomeric product, and when incorporated in an elastomeric product, the weft cords melt away, forming domains 17 of polymeric material in the elastomeric product.

Figure 6:
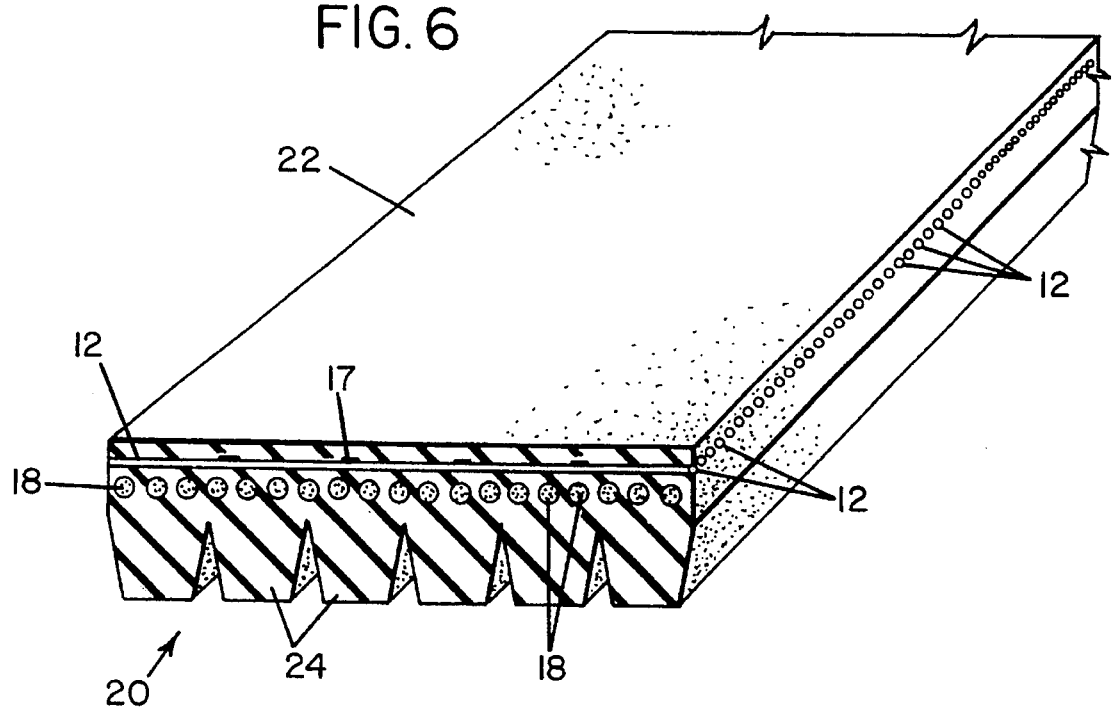
FIG. 6 illustrates a cured poly-V belt structure using the same reinforcement.
Figure 5:
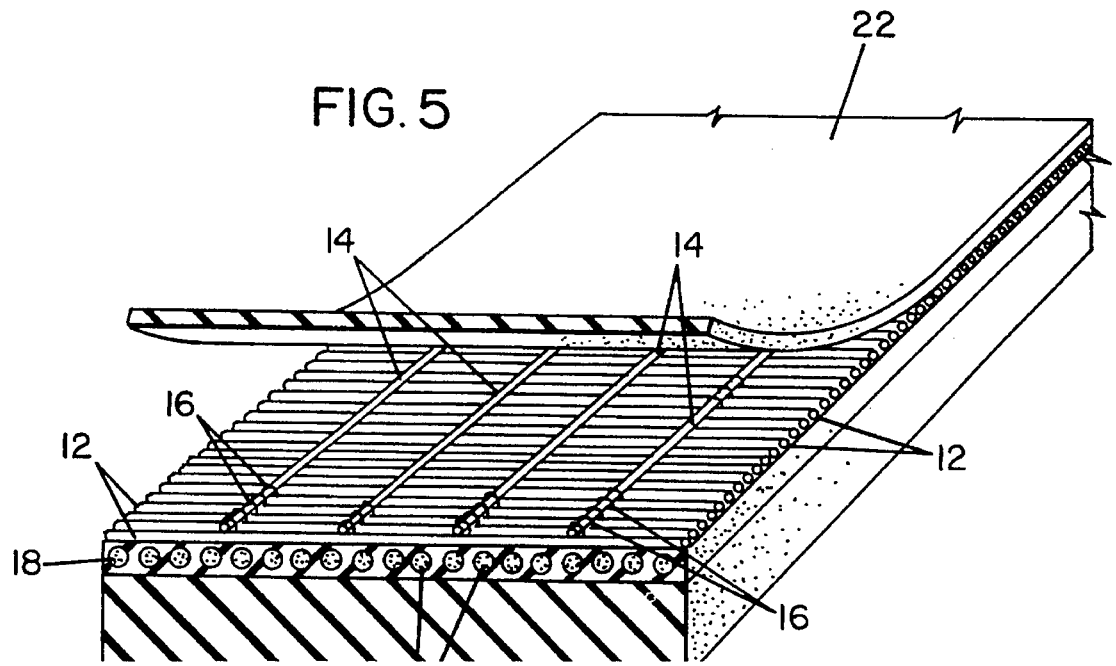
FIG. 5 illustrates a green belt using the reinforcement of the invention, with the top layer rolled back to expose the reinforcement.

With reference now to FIGS. 5 and 6, the use of the reinforcement of the invention is illustrated in a poly-V belt 20 and green continuous belt 20a. Those skilled in the art will recognize that such reinforcement can be used in V-belts, and other types of continuous belts.

In the illustrated embodiment, Poly V® belt 20 is comprised of six ribs 24 for use with a six groove sheave. Cords 18 provide the drive strength for the belt and may comprise aramid, steel, polyester, glass or similar high tensile strength material. When such a Poly-V® belt is used, cords 18 are stressed at high speeds and the forces encountered in driving or being driven by sheaves tend to separate cords 18 from one another. In the structure of such belts, high strength filaments or cords 12 are applied over drive cords 18, and perpendicular thereto to work against the tendency of the cords to separate, and to help prevent the splitting of the belt.

Figure 2:
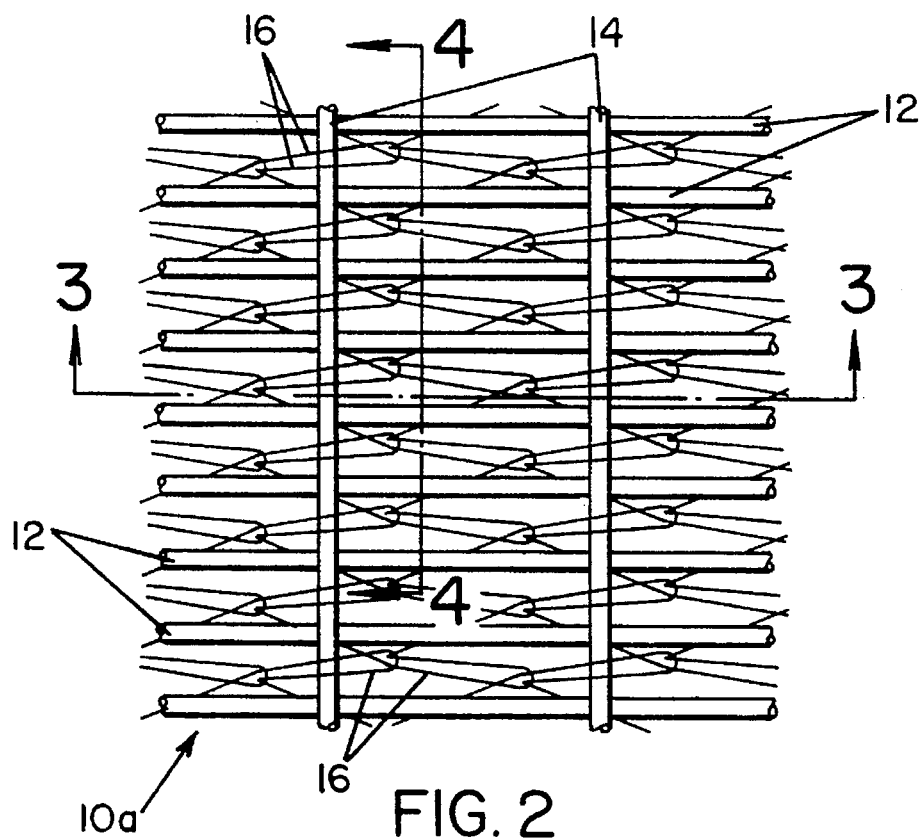
FIG. 2 illustrates an enlarged schematic view of an embodiment where the warp and weft are knitted.

Since it is not efficient to apply cords 12 individually, perpendicular to the direction of movement of the belt, such cords are usually applied in a fabric as shown in FIG. 1 or FIG. 2. The weft cords 14 of such a fabric, which are necessary to hold cords 12 in place while the fabric is calendered or otherwise coated with rubber, add to the stiffness of the construction since they restrict the independent movement of warp cords 12, and add to the thickness and stiffness of the reinforcement package.

In the concept of the instant invention, it was theorized that removal of weft cords 14 would increase the flexibility of a product made using such reinforcement by releasing the stress on warp cords 12 and permitting them to move independently of one another. Since warp cords 12 are perpendicular to the direction of movement of Poly-V® belt 20 and an are free to move independently, the unit area stiffness added to the belt 20 by this ply would be substantially equal to the stiffness of a single reinforcement cord 18 embedded in the thickness of rubber equivalent to the rivet of the ply.

To practice the invention, it was proposed to make weft cords 14 of a polymeric material that melts at the temperatures used to cure an elastomeric product in which it is used. Accordingly, if an elastomeric product is cured at a temperature of 200° to 300° F., and the weft cords melt at such a temperature, the weft cords melt and form domains 17 of polymeric material in the elastomer 22 when the elastomer is cured. Fabric having the construction described above was prepared for such purpose according to Goodyear specifications by Wellington-Sears.

While the invention has been specifically illustrated and described, those skilled in the art will recognize that the invention can be variously modified and practiced. The invention is limited only by the following claims.

What is claimed is:

1. A continuous belt comprising an elastomeric matrix containing domains of polymeric material having a melting point of 200° to 300° F. and reinforced by a plurality of parallel reinforcement cords or filaments whereby said reinforcement cords or filaments are not connected to each other and move independently of one another in said elastomeric matrix.

2. The continuous belt of claim 1 wherein said belt is made using reinforcement fabric having non-interwoven reinforcement cords and weft cords which are held in position relative to one another by interweaving cords or filaments and where said weft cords comprise a polymeric material having a melting temperature of 200° F. to 300° F. and said weft cords or filaments are melted and dispersed in said elastomeric matrix during the curing of said belt, creating polymer domains in said elastomeric matrix.

3. The continuous belt of claim 1 wherein said reinforcement cords are oriented perpendicular to the direction of movement of said belt and said belt has a per unit area flexibility substantially equal to the per unit area flexibility of a single reinforcement cord imbedded in said elastomeric matrix.

\* \* \* \* \*